(12) United States Patent
Kanemoto (10) Patent No.: US 9,615,148 B2
(45) Date of Patent: Apr. 4, 2017

(54) COMMUNICATION APPARATUS, COMMUNICATION SYSTEM, AND COMMUNICATION METHOD

(75) Inventor: Toshinori Kanemoto, Kanagawa (JP)

(73) Assignee: Sony Corporation (JP)

( * ) Notice: Subject to any disclaimer, the term of this patent is extended or adjusted under 35 U.S.C. 154(b) by 87 days.

(21) Appl. No.: 13/370,405

(22) Filed: Feb. 10, 2012

(65) Prior Publication Data

US 2012/0212325 A1 Aug. 23, 2012

(30) Foreign Application Priority Data

Feb. 18, 2011 (JP) .............................. P2011-033543

(51) Int. Cl.
*H04Q 5/22* (2006.01)
*H04Q 9/00* (2006.01)

(52) U.S. Cl.
CPC .................................... *H04Q 9/00* (2013.01)

(58) Field of Classification Search
CPC .................................................... G08C 17/02
USPC ....... 340/10.1–10.5, 870.01; 455/428, 432.3, 455/557
See application file for complete search history.

(56) References Cited

U.S. PATENT DOCUMENTS

| | | | |
|---|---|---|---|
| 2006/0044113 A1* | 3/2006 | Hashimoto et al. | 340/10.1 |
| 2007/0273481 A1* | 11/2007 | Soleimani | 340/10.1 |
| 2008/0079573 A1* | 4/2008 | Bloebaum | G06F 17/30876 340/568.1 |
| 2010/0141387 A1 | 6/2010 | Kosaka | |
| 2011/0201898 A1* | 8/2011 | Benco et al. | 600/300 |
| 2012/0042130 A1* | 2/2012 | Peapell | 711/126 |
| 2012/0144078 A1* | 6/2012 | Poulsen | 710/105 |
| 2012/0200423 A1* | 8/2012 | DiLuciano et al. | 340/870.01 |

FOREIGN PATENT DOCUMENTS

| | | |
|---|---|---|
| DE | 102007004603 A1 | 8/2008 |
| JP | 2005165770 A | 6/2005 |
| JP | 2005537543 A | 12/2005 |
| JP | 2007249553 A | 9/2007 |
| JP | 2008-160856 A | 7/2008 |
| JP | 2008538458 A | 10/2008 |
| JP | 2009187495 A | 8/2009 |

(Continued)

OTHER PUBLICATIONS

Japanese Office Action for JP Application No. 2011033543, dated Jan. 20, 2015.

(Continued)

*Primary Examiner* — Ojiako Nwugo
(74) *Attorney, Agent, or Firm* — Lerner, David, Littenberg, Krumholz & Mentlik, LLP (57) ABSTRACT

A communication apparatus includes: a data generating unit that generates write data to be sent to any other communication apparatus at an arbitrary timing; a communication unit that repeatedly sends a read request to the other communication apparatus until the write data is generated and, at the same time, repeatedly receives a read response sent from the other communication apparatus in response to the read request; and a data acquisition unit that acquires read data, which is sent along with the read response by the other communication apparatus, when the read data is generated at an arbitrary timing by the other communication apparatus.

14 Claims, 7 Drawing Sheets

(56) References Cited

FOREIGN PATENT DOCUMENTS

JP        2010-134672 A     6/2010
JP        2010211349 A     9/2010

OTHER PUBLICATIONS

Japanese Office Action for JP Application No. 2011033543, dated Dec. 8, 2015. Machine Translation.
Extended European Search Report for Application No. EP12152852.5 dated Jul. 27, 2016.
Japanese Office Action for JP Application No. 2011033543, dated Jul. 14, 2015.

* cited by examiner

ATTRIBUTE INFORMATION BLOCK

| MAPPING VERSION | NUMBER OF BLOCKS SIMULTANEOUSLY READABLE | NUMBER OF BLOCKS SIMULTANEOUSLY WRITABLE | NUMBER OF MEMORY AREA BLOCKS | (UNUSED FIELD) | HALF-WAY WRITE FLAG | ACCESS ATTRIBUTE FLAG | EFFECTIVE DATA LENGTH | ERROR CHECKING CODE |
|---|---|---|---|---|---|---|---|---|
| (Ver) | (Nbr) | (Nbw) | (Nmaxb) | | (WriteF) | (RWFlag) | (Ln) | (Checksum) |

AI

COMMUNICATION APPARATUS, COMMUNICATION SYSTEM, AND COMMUNICATION METHOD

CROSS-REFERENCE TO RELATED APPLICATION

The present application claims priority from Japanese Patent Application No. JP 2011-033543 filed in the Japanese Patent Office on Feb. 18, 2011, the entire content of which is incorporated herein by reference.

BACKGROUND

The present disclosure relates to communication apparatuses, communication systems, and communication methods.

In related technologies such as those disclosed in Japanese Unexamined Patent Application Publications No. 2008-160856 and No. 2010-134672, there are some cases where passive communication between two communication apparatuses is performed in response to a communication request (one of commands) made only by one of the two communication apparatuses. In these cases, the one communication apparatus that makes the communication request works as an initiator, and the other communication apparatus works as a target.

SUMMARY

Each of the initiator and the target generates data at an arbitrary timing. Upon completing the generation of data to be sent to the target, the initiator sends a communication request to the target at an arbitrary timing and can send the data to the target. On the other hand, even if the target completes the generation of data to be sent to the initiator, it is difficult for the target to send the data to the initiator until the target receives a communication request from the initiator.

In order to resolve the above problem, a method in which a flag showing the presence or absence of data to be sent to the initiator is stored in a memory of the target and this flag information is periodically checked by the initiator is conceivable. In the above method, however, time is wasted for the initiator to confirm the presence of the flag and then send the communication request. On top of that, extra resources are used for storing the flag information and checking the flag information.

With the above-described problems in mind, embodiments of the present disclosure are intended to provide communication apparatuses, a communication system, and a communication method, in which the communication apparatus that works as a target can send data at an arbitrary timing to a communication apparatus that works as an initiator.

An embodiment of the present disclosure provides a communication apparatus including: a data generating unit that generates write data to be sent to any other communication apparatus at an arbitrary timing; a communication unit that repeatedly sends a read request to the other communication apparatus until the write data is generated and, at the same time, repeatedly receives a read response sent from the other communication apparatus in response to the read request; and a data acquisition unit that acquires read data, which is sent along with the read response by the other communication apparatus, when the read data is generated at an arbitrary timing by the other communication apparatus.

Another embodiment of the present disclosure provides a communication apparatus including: a data generating unit that generates read data to be sent to any other communication apparatus at an arbitrary timing; and a communication unit that repeatedly receives a read request sent from the other communication apparatus until write data is generated by the other communication apparatus and, at the same time, repeatedly sends a read response to the other communication apparatus in response to the read request, and sends the read data along with the read response to the other communication apparatus when the read data is generated.

Another embodiment of the present disclosure provides a communication system having a first communication apparatus and a second communication apparatus, in which the first communication apparatus includes: a data generating unit that generates write data to be sent to a second communication apparatus at an arbitrary timing; a communication unit that repeatedly sends a read request to the second communication apparatus until the write data is generated and, at the same time, repeatedly receives a read response sent from the second communication apparatus in response to the read request; and a data acquisition unit that acquires read data, which is sent along with the read response by the second communication apparatus, when the read data is generated at an arbitrary timing by the second communication apparatus, and the second communication apparatus includes: a data generating unit that generates read data to be sent to the first communication apparatus at an arbitrary timing; and a communication unit that repeatedly receives the read request sent from the first communication apparatus until the write data is generated by the first communication apparatus and, at the same time, repeatedly sends the read response to the first communication apparatus in response to the read request, and sends the read data along with the read response to the first communication apparatus when the read data is generated.

Another embodiment of the present disclosure provides a communication method including: causing a first communication apparatus to generate write data to be sent to a second communication apparatus at an arbitrary timing; causing the second communication apparatus to generate read data to be sent to the first communication apparatus at an arbitrary timing; causing the first communication apparatus to repeatedly send a read request to the second communication apparatus until the write data is generated; causing the second communication apparatus to repeatedly send a read response in response to the read request to the first communication apparatus; and causing the first communication apparatus to receive the read request and acquire the read data, which is sent along with the read response by the second communication apparatus, when the read data is generated by the second communication apparatus.

As described above, according to the embodiments of the present disclosure, two communication apparatuses, a communication system, and a communication method, in which one of the two communication apparatuses that works as a target can send data at an arbitrary timing to the other that works as an initiator, can be provided.

DETAILED DESCRIPTION OF EMBODIMENTS

Preferred embodiments of the present disclosure will be described with reference to the accompanying drawings hereinafter. In this specification and the accompanying drawings, components that have effectively the same functional configuration are indicated by the same reference numerals and repeated description is avoided.

1. OVERVIEW OF COMMUNICATION METHOD

Figure 1:
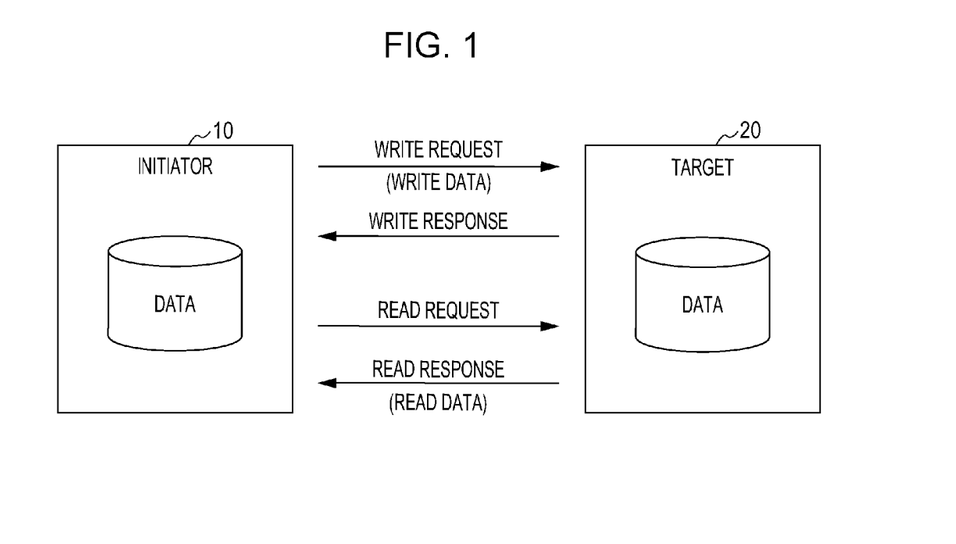
FIG. 1 is a diagram showing an overview of a communication method according to an embodiment of the present disclosure.

First, an overview of a communication method according to an embodiment of the present disclosure will be described with reference to FIG. 1. FIG. 1 is a diagram showing an overview of a communication method according to an embodiment of the present disclosure.

As shown in FIG. 1, the communication method according to the embodiment of the present disclosure is a communication method in which communication is performed between a first communication apparatus working as an initiator 10 and a second communication apparatus working as a target 20. For example, the initiator 10 includes a reader/writer, and the target 20 includes an RFID (radio frequency identification) module and a host (CPU). Passive communication is performed between the initiator 10 and the target 20 in response to a communication request (one of commands) such as a write request or a read request sent by the initiator 10.

In the communication method according to the embodiment of the present disclosure, the initiator 10 generates write data to be sent to the target 20 at an arbitrary timing, and the target 20 generates read data to be sent to the initiator 10 at an arbitrary timing. After generating write data, the initiator 10 sends a write request and the write data to the target 20, and the target 20 acquires the write data in response to the write request.

The initiator 10 repeatedly sends a read request to the target 20 until the initiator 10 generates write data, and the target 20 repeatedly sends a read response in response to the read request to the initiator 10. Subsequently, after the target 20 generates read data, the initiator 10 acquires the read data along with the read response sent by the target 20.

In the above-described way, even if the target 20 does not have a notification function of issuing a communication request, the target 20 can send the read data to the initiator 10 at an arbitrary timing by sending the read data at the timing of the read data generation in response to the read request the target 20 repeatedly receives. Therefore, two-way communication can be effectively performed between the initiator 10 and the target 20 in synchronization with the timing of the read data generation or the write data generation.

2. CONFIGURATION OF COMMUNICATION SYSTEM

Figure 2:
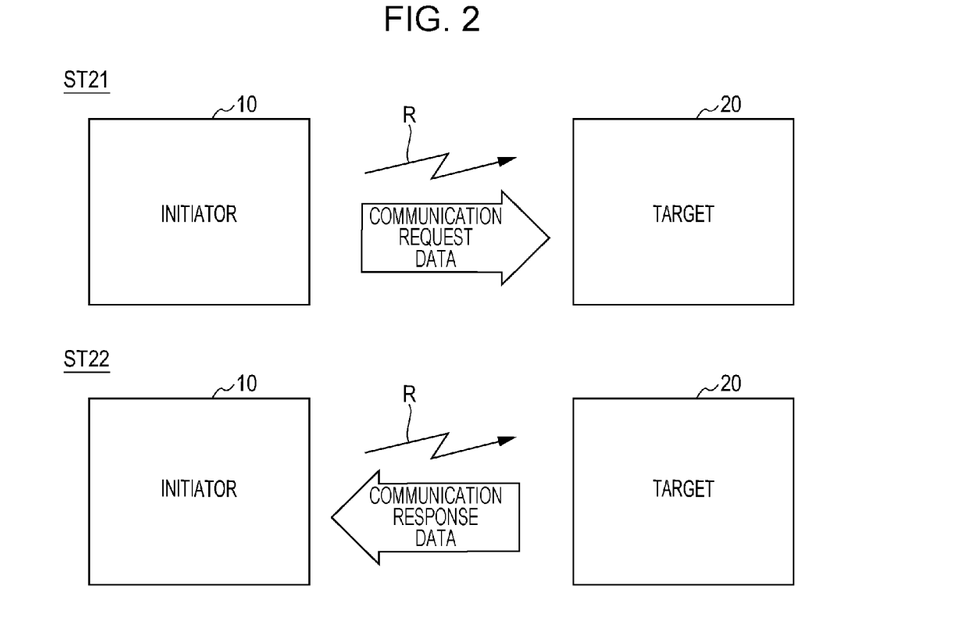
FIG. 2 is a diagram showing passive communication performed between an initiator and a target.

Next, a configuration of a communication system according to the embodiment of the present disclosure will be described with reference to FIG. 2 and FIG. 3. FIG. 2 is a diagram showing passive communication performed between the initiator 10 and the target 20.

As shown in FIG. 2, passive communication is performed between the initiator 10 and the target 20 in compliance with an NFC (near field communication) protocol or the like. The NFC protocol is a protocol for short range wireless communication that employs electromagnetic induction phenomenon and uses a single frequency carrier, for example, 13.56 MHz in the ISM (industrial, scientific and medical) band. Short range wireless communication is communication performed between two communication apparatuses spaced apart from each other by about several tens of centimeters, and this type of wireless communication includes communication performed between two communication apparatuses that are contacting each other.

In the NFC, communication is performed in a passive mode or in an active mode. In a passive mode, as shown in FIG. 2, communication is performed in such a way that one communication apparatus works as the initiator 10, and the other works as the target 20. The initiator 10 sends a communication request (one of commands) to the target 20, and the target 20 sends a communication response (one of responses) to the initiator 10 in response to the communication request. The initiator 10 sends the communication request and data to the target 20 by modulating an electromagnetic wave R (used as a carrier wave) generated by the initiator 10 itself (in the state ST21), and the target 20 sends the communication response and data to the initiator 10 by load-modulating the electromagnetic wave R (used as the carrier wave) generated by the initiator 10 (in the state ST22).

Figure 3:
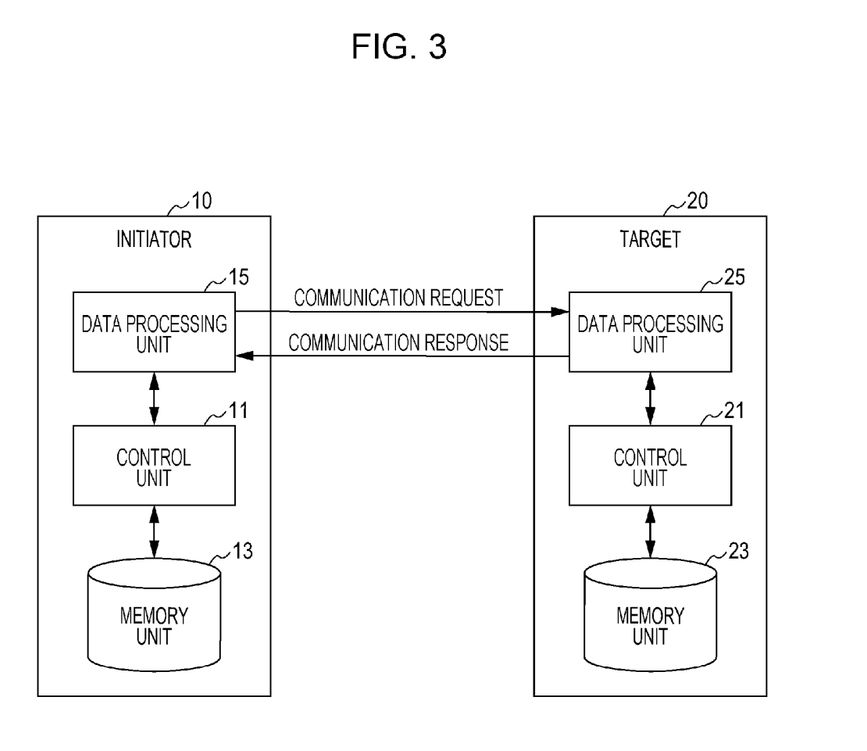
FIG. 3 is a block diagram showing the functional configuration of a communication system.

FIG. 3 is a block diagram showing the functional configuration of the communication system. As shown in FIG. 3, the communication system includes the initiator 10 and the target 20.

The initiator 10 includes a controller and a reader/writer connected to the controller (neither is shown). The controller can be a personal computer, a PDA, a mobile phone, a consumer electronics device, or the like. Alternatively, the controller can be a CPU mounted in the above devices. The target 20 includes a host (CPU) and an RFID module connected to the host (neither is shown). The host can be a personal computer, a PDA, a mobile phone, a consumer electronics device, or the like. Alternatively, the host can be a CPU mounted in the above devices. The controller and the reader/writer are connected to each other via a communication interface. The host and the RFID are also connected to each other via a communication interface.

The first communication apparatus working as the initiator 10 includes a control unit 11, a memory unit 13, and a data processing unit 15. The control unit 11 works as a data generating unit and a data acquisition unit, and the data processing unit 15 works as a communication unit. FIG. 3 shows that the controller unit 11, the memory unit 13, and the data processing unit 15 included in the initiator 10 are configured as an all-one-unit, but each of these units can be provided as a separate unit.

The control unit 11 generates write data to be sent to the target 20 at an arbitrary timing. The controller 11 judges whether the generation of the write data is completed or not, and, if completed, generates a write request, and controls the data processing unit 15 so that the write request as well as the write data is sent to the target 20. The controller 11 repeatedly generates a read request until the write data is generated, and controls the data processing unit so that the read request is sent to the target 20. In addition, the control unit 11 controls the data processing unit 15 so that the data processing unit 15 acquires read data along with a read response sent from the target 20 when the target 20 generates the read data. In addition, the control unit 11 stores the acquired read data in the memory unit 13.

The data processing unit 15 sends the write request along with the write data to the target 20 and also sends the read request to the target 20 by sending an electromagnetic wave that the data processing unit 15 modulates with the use of an antenna coil or the like. In addition, the data processing unit 15 receives a write response from the target 20 and also receives the read response along with the read data from the target 20 by receiving an electromagnetic wave load-modulated by the target 20. The data processing unit 15 repeatedly sends the read request to the target 20 until the write data is generated, and sends the write request along with the write data to the target 20 when the write data is generated.

The second communication apparatus working as the target 20 includes a control unit 21, a memory unit 23, and a data processing unit 25. The control unit 21 works as a data generating unit and a data acquisition unit, and the data processing unit 25 works as a communication unit. FIG. 3 shows that the controller unit 21, the memory unit 23, and the data processing unit 25 included in the target 20 are configured as an all-one-unit, but each of these units can be provided as a separate unit.

Upon receiving the write request, the control unit 21 acquires the write data sent by the initiator 10 along with the write request, and stores the write data in the memory unit 23. In addition, the control unit 21 controls the data processing unit 25 so that the write response is sent to the initiator 10. The control unit 21 generates the read data to be sent to the initiator 10 at an arbitrary timing. Upon receiving the read request, the controller 21 judges whether the generation of the read data is completed or not, and, if completed, controls the data processing unit 25 so that the read response is sent to the initiator 10. The control unit controls the data processing unit 25 so that the data processing unit 25 sends the read response as well as the read data to the initiator 10 when the generation of the read data is completed, and sends the read response to the initiator 10 when the generation of the read data is not completed.

The data processing unit 25 receives the write request along with the write data sent from the initiator 10 and also receives the read request sent from the initiator 10 by receiving the electromagnetic wave that is modulated with the use of the antenna coil or the like. In addition, the data processing unit 25 sends the write response to the initiator 10 and also sends the read response to the initiator by load-modulating and sending the electromagnetic wave sent by the initiator 10. The data processing unit 25 sends the read data as well as the read response to the initiator 10 when the generation of the read data is completed, and sends only the read response to the initiator 10 when the generation of the read data is not completed.

3. OPERATION OF COMMUNICATION SYSTEM

Figure 4:
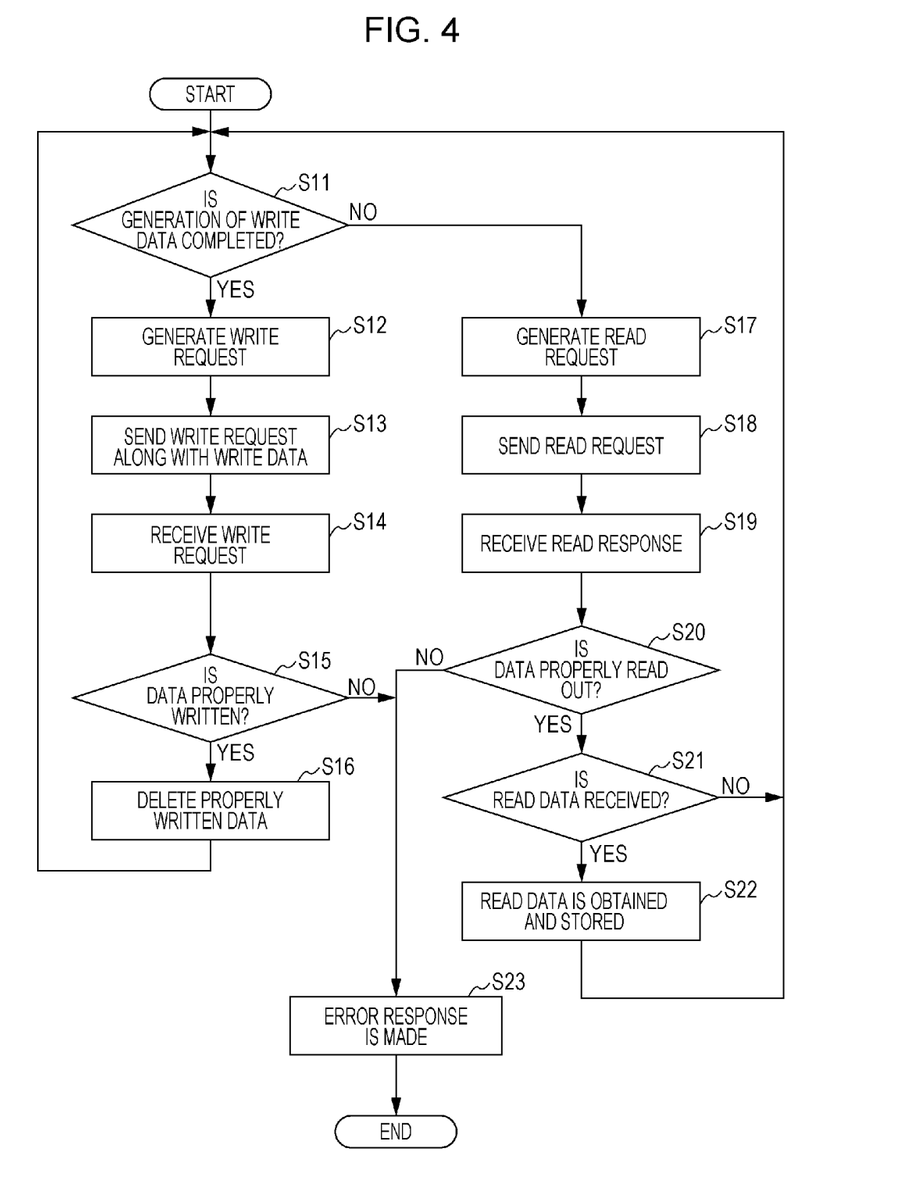
FIG. 4 is a flowchart showing the operation of the initiator.
Figure 5:
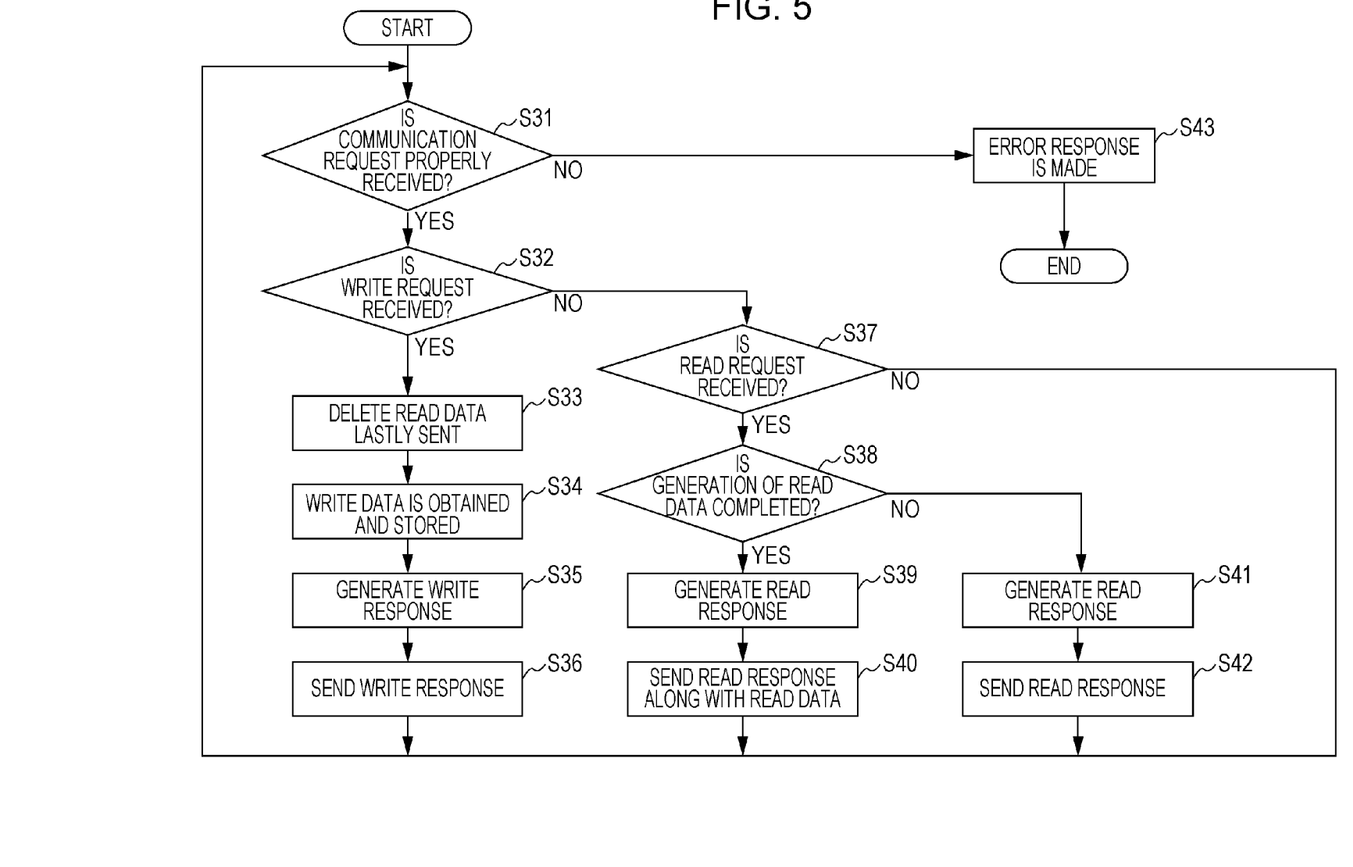
FIG. 5 is a flowchart showing the operation of the target.

Next, the procedure of data communication performed between the initiator 10 and the target 20 will be described with reference to FIG. 4 to FIG. 6. FIG. 4 is a flowchart showing the operation of the initiator 10, and FIG. 5 is a flowchart showing the operation of the target 20. In the following description, it will be assumed that a short range wireless communication link is established between the initiator 10 and the target 20 through a polling request and a polling response.

The control unit 11 of the initiator 10 generates write data at an arbitrary timing. The write data is data that is sent from the initiator 10 to the target 20 so that the data is stored in the target 20. As shown in FIG. 4, the control unit 11 judges whether the generation of the write data is completed or not (at step S11). The control unit 11 performs write processing at step S12 to step S16 when the generation of the write data to be sent to the target 20 is completed ("Yes" at step S11), and performs read processing at step S17 to step S22 when the generation of the write data to be sent to the target 20 is not completed ("No" at step S11).

In the write processing, the control unit 11 generates a write request as a communication request (at step S12). The write request is generated in order for the initiator 10 to request the target 20 to write data. The control unit 11 supplies the write request and the write data to the data processing unit 15. The write data can be directly supplied to the data processing unit 15 by the control unit 11, or can be supplied after being read out from the memory 13 by the control unit 11.

The data processing unit 15 sends the write request and the write data to the target 20 (at step S13), and receives a write response sent from the target 20 in response to the write request (at step S14). The write data can be sent in the form of being included in the write request, or can be sent independently of the write request. The write response is generated by the target 20 in order for the target to inform the initiator 10 of the result of the data writing. The data processing unit 15 supplies the received write response to the control unit 11.

The control unit 11 judges whether the data is properly written into the target 20 or not on the basis of the write response (at step S15). If it is judged that the data is properly written ("Yes" at step S15), the control unit 11 deletes the data, which is stored in the memory unit 13 and has already been written into the target 20, from the memory unit 13 (at step S16). If it is not judged that the data is properly written ("No" at step S15), the control unit 11 makes an error response (at step S23). In this error response, the control unit 11 can cause the flow to go back to the process at step S12 to restart the write processing, or can cause the flow to go back to the process at step S11 to judge whether the generation of the write data is completed or not.

On the other hand, in the read processing, the control unit 11 generates a read request as a communication request (at step S17). The read request is generated in order for the initiator 10 to request the target 20 to read out data. The control unit 11 supplies the read request to the data processing unit 15.

The data processing unit 15 sends the read request to the target 20 (at step S18), and receives a read response sent from the target 20 in response to the read request (at step S19). The read response is generated by the target 20 in order for the target 20 to inform the initiator 10 of the result of the data reading. The data processing unit 15 supplies the received read response to the control unit 11.

In this case, the data processing unit 15 receives read data along with the read response sent from the target 20 when the generation of the read data is completed by the target 20, that is, when the generation of the read data to be sent to the initiator 10 is completed by the target 20 that has already received the read request from the initiator 10. On the other hand, the data processing unit 15 does not receive the read data from the target 20 when the generation of the read data is not completed by the target 20. The read data can be received in the form of being included in the read response, or can be received independently of the read response.

The control unit 11 judges whether the data is properly read out by the target 20 or not on the basis of the read response (at step S20). If it is judged that the data is properly read out ("Yes" at step S20), the control unit 11 judges whether the data processing unit 15 receives the read data or not (at step S21). If it is not judged that the data is properly read ("No" at step S20), the control unit 11 makes an error response (at step S23). In this error response, the control 11 can cause the flow to go back to the process at step S17 to restart the read processing, or can cause the flow to go back to the process at step S11 to judge whether the generation of the write data is completed or not. If the data processing unit 15 has received the read data ("Yes" at step S21), the control unit 11 acquires the read data from the data processing unit 15, and stores the read data in the memory unit 13 (at step S22).

In addition, even if the generation of the read data is not completed by the target 20, the data processing unit 15 can receive dummy data along with the read response sent from the target 20. The dummy data is essentially not data to be sent to the initiator 10, and it is data useless for the initiator 10. Again in this case, the dummy data can be received in the form of being included in the read response, or can be received independently of the read response.

After the process at step S16, the process at step S22, or when the data processing unit 15 has not received the read data ("No" at step S21), the control unit 11 restarts the process at step S11. The control unit 11 repeatedly performs the above-described processes as long as the short range wireless communication link is established between the initiator 10 and the target 20.

The control unit 21 of the target 20 receives a communication request (one of commands) from the reader/writer via the data processing unit 25. As shown in FIG. 5, the control unit 21 judges whether the communication request is properly received or not (at step S31). If it is judged that the communication request is properly received ("Yes" at step S31), the control unit 21 performs the following processes. If it is not judged that the communication request is properly received ("No" at step S31), the control unit 21 makes an error response (at step S43). The control unit 21 performs write processing at step S33 to step S36 when receiving a write request ("Yes" at step S32), and performs read processing at step S38 to step S42 when receiving a read request ("Yes" at step S37).

In the write processing, the control unit 21 deletes the read data that has been last sent to the initiator 10 as well as the last read response from the memory unit 13 (at step S33). The above process is performed because the fact that the write request is received by the control unit 21 means that the last read processing has been successfully completed between the initiator 10 and the target 20. The control unit 21 acquires write data as well as the write request, which is received by the data processing unit 25, from the data processing unit 25, and stores the write data in the memory unit 23 (at step S34). The control unit 21 supplies the result of the data writing to the data processing unit 25. The data processing unit 25 generates a write response including the result of the data writing (at step S35), and sends the write response to the initiator 10 (at step S36).

In the read processing, the control unit 21 judges whether the generation of read data to be sent is completed or not (at step S38). Here, the control unit 21 generates the read data at an arbitrary timing. The read data is data to be sent from the target 20 so that the read data is read out by the initiator 10.

When the generation of the read data is completed ("Yes" at step S38), that is, when the generation of the read data to be sent to the initiator 10 is completed, the control unit 21 supplies the result of the data reading along with the read data to the data processing unit 25. The data processing unit 25 generates a read response including the result of the data reading (at step S39), and sends the read response along with the read data to the initiator 10 (at step S40). The read data can be sent in the form of being included in the read response, or can be sent independently of the read response. On the other hand, when the generation of the read data is not completed ("No" at step S38), the control unit 21 supplies the result of the data reading to the data processing unit 25. The data processing unit 25 generates a read response including the result of the data reading (at step S41), and sends the read response to the initiator 10 (at step S42).

In addition, even if the generation of the read data is not completed, the data processing unit 25 can send dummy data along with the read response to the initiator 10. Again in this case, the dummy data can be sent in the form of being included in the read response, or can be sent independently of the read response.

After the processes at step S36, step S40 and step S42, the control unit 21 makes the flow to go back to the step S31 to restart the operation of the target 20. The control unit 21 repeatedly performs the above-described processes as long as the short range wireless communication link is established between the initiator 10 and the target 20.

Figure 6:
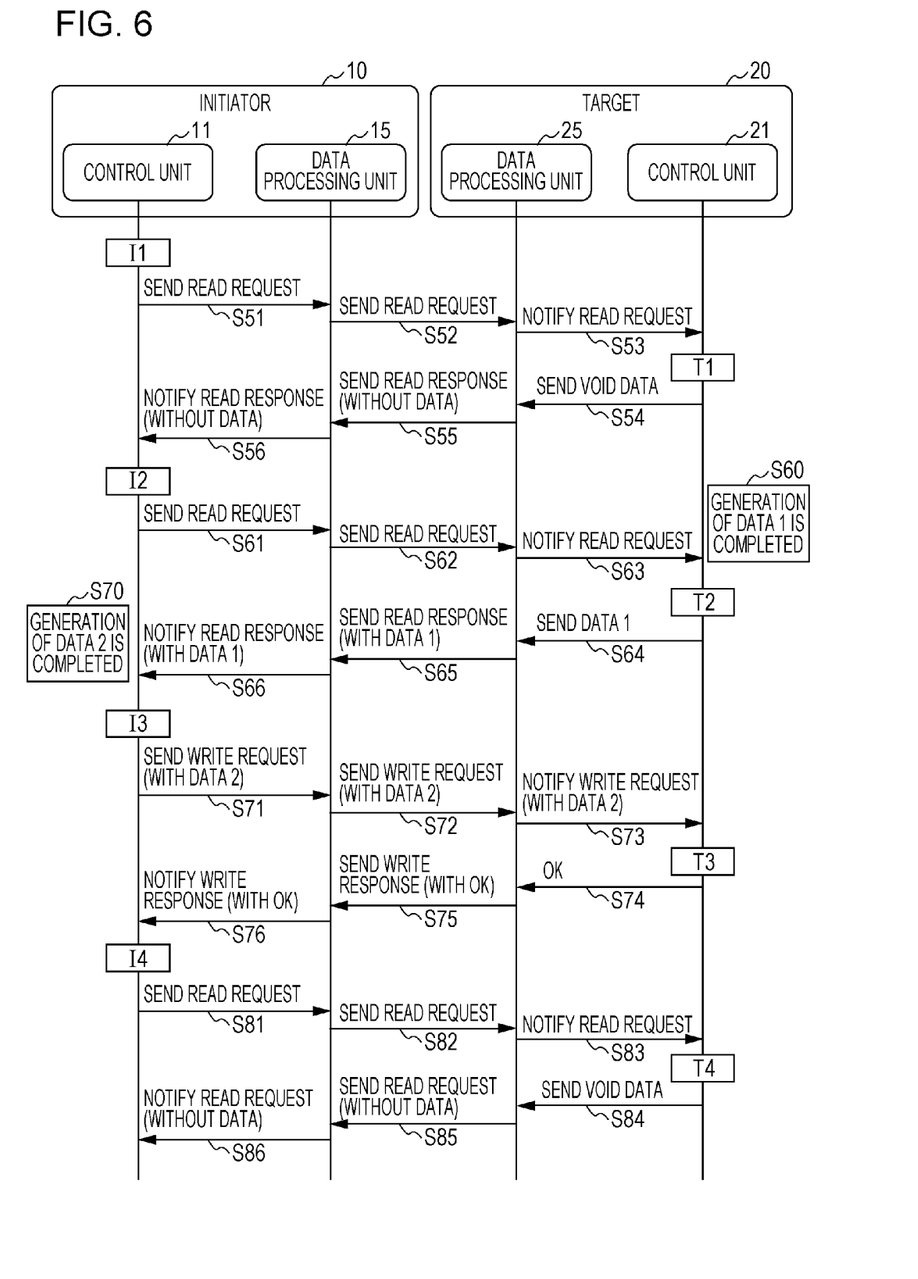
FIG. 6 is a sequence diagram showing the communication method according to the embodiment of the present disclosure.

FIG. 6 is a sequence diagram showing a communication method according to the embodiment of the present disclosure. In the following description, it will be assumed that a short range wireless communication link is established between the initiator 10 and the target 20 through a polling request and a polling response.

An example of the sequence diagram in FIG. 6 shows four timings I1, I2, I3, and I4 in the control unit 11 of the initiator 10, and it will be assumed that write data (data 2) is generated just before a timing I3 (at step S70). In addition, there are four timings T1, T2, T3, and T4 in the control unit 21 of the target 20, and it will be assumed that read data (data 1) is generated just before a timing T2 (at step S60).

First, because the generation of write data is not completed by the control unit 11 of the initiator 10 before the timing I1, the initiator 10 generates read request and supplies the read request to the data processing unit 15 (at step S51). The data processing unit 15 sends the read request to the target 20 (at step S52).

The data processing unit 25 of the target 20 receives the read request, and notifies the control unit 21 of the read request (at step S53). Because the generation of read data is not completed by the control unit 21 before the timing T1, the control unit 21 supplies void data or dummy data to the data processing unit 25 (at step S54). The data processing unit 25 generates read response, and sends the read response along with the void data or dummy data to the initiator 10 (at step S55).

The data processing unit 15 of the initiator 10 receives the read response, and notifies the control unit 11 of the read response (at step S56). In this case, the data processing unit 15 can supply the read response without no read data, or can supply the read response with the dummy data to the control unit 11.

Next, because the generation of write data is not completed by the control unit 11 of the initiator 10 before the timing I2, the initiator 10 generates read request and supplies the read request to the data processing unit 15 (at step S61). The data processing unit 15 sends the read request to the target 20 (at step S62).

The data processing unit 25 of the target 20 receives the read request, and notifies the control unit 21 of the read request (at step S63). Because the generation of read data (data 1) is completed by the control unit 21 before the timing T2 (at step S60), the control unit 21 supplies the read data to the data processing unit 25 (at step S64). The data processing unit 25 generates read response, and sends the read response along with the read data to the initiator 10 (at step S65).

The data processing unit 15 of the initiator 10 receives the read response, and notifies the control unit 11 of the read response (at step S66). In this case, the data processing unit 15 supplies the read data to the control unit 11, and the control unit 11 acquires the read data to store the read data in the memory unit 13. As a result, the read data is read out from the target 20 by the initiator 10.

Next, because the generation of write data (data 2) is completed by the control unit 11 of the initiator 10 before the timing I3 (at step S70), the control unit 11 generates write request and supplies the write request as well as the write data to the data processing unit 15 (at step S71). The data processing unit 15 sends the write request as well as the write data to the target 20 (at step S72).

Upon receiving the write request, the data processing unit 25 of the target 20 notifies the control unit of the write request and sends the write data to the control unit 21 (at step S73). The control unit 21 acquires the write data to store the write data in the memory unit 23, and notifies the data processing unit 25 of the result of the data writing (OK) (at step S74). As a result, the write data is written in the target 20 by the initiator 10. The data processing unit 25 generates write response, and sends the write response to the initiator 10 (at step S75).

The data processing unit 15 of the initiator 10 receives the write response, and notifies the control unit 11 of the write response (at step S76).

Next, because the generation of write data is not completed by the control unit 11 of the initiator 10 before the timing I4, the control unit 11 generates read request and supplies the read request to the data processing unit 15 (at step S81). The data processing unit 15 sends the read request to the target 20 (at step S82).

Upon receiving the read request, the data processing unit 25 of the target 20 notifies the control unit 21 of the read request (at step S83). Because the generation of read data is not completed by the control unit 21 before the timing T4, the control unit 21 supplies void data or dummy data to the data processing unit 25 (at step S84). The data processing unit 25 generates read response, and sends the read response along with the void data or dummy data to the initiator 10 (at step S85).

The data processing unit 15 of the initiator 10 receives the read response, and notifies the control unit 11 of the read response (at step S86). In this case, the data processing unit 15 can supply the read response without no read data, or can supply the read response with the dummy data to the control unit 11.

The above description about FIG. 6 has been made in the case where the read processing and the write processing are performed in this order. However, even in the case where the write processing and the read processing are performed in this order, or in the case where the same processing is successively performed, the same description as above can be made. In each of the above cases, read processing is repeatedly performed between the initiator 10 and the target 20 until the initiator 10 generates write data.

4. EXAMPLE OF COMMUNICATION SYSTEM

The following description will be made about the case where the above-described communication method is applied to a short range wireless communication compliant with Type 3 Tag Operation specification defined by the NFC forum (registered trademark).

Figure 7:
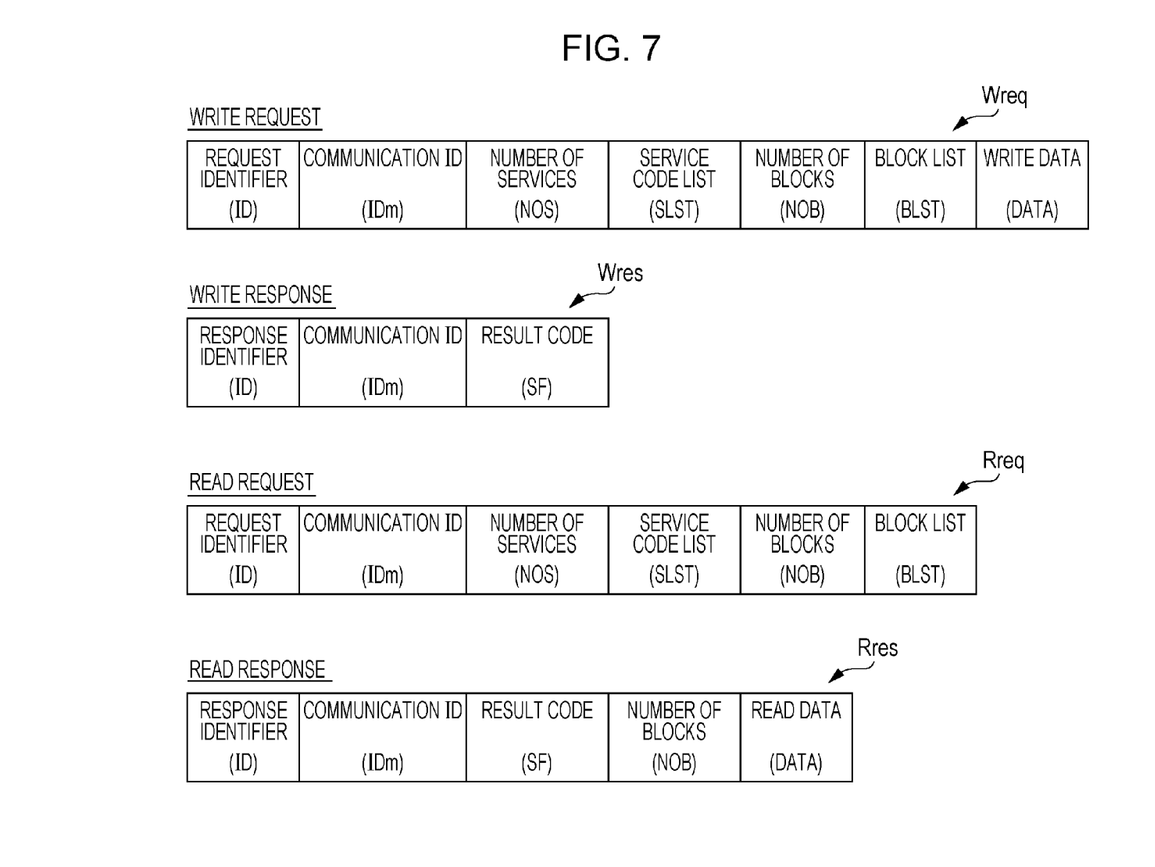
FIG. 7 is a diagram showing examples of data structures of communication requests/communication responses.

FIG. 7 is a diagram showing examples of data structures of communication requests/communication responses. A write request is equivalent to an "Updated Command" defined by the specification, and its data structure Wreq includes fields for a request identifier (ID), a communication ID (IDm), the number of services (NOS), a service code list (SLST), the number of blocks (NOB), a block list (BLST), and write data (DATA). The write request with this data structure Wreq that includes write data is sent from the initiator 10 to the target 20. A write response is equivalent to an "Updated Response" defined by the specification, and its data structure Wreq includes fields for a response identifier (ID), a communication ID (IDm), and a result code (SF).

Upon receiving a write request, the data processing unit 25 of the target 20 extracts the request identifier, the number of blocks, the block list, and the write data of the write request, and supplies them to the control unit 21. Here, the number of blocks and the block list respectively indicate the number of blocks and the block codes of write data to be written in the target 20. After the write processing is completed, the control unit 21 supplies a result code showing the result of the data writing to the data processing unit 25. Here, the result code indicates whether the write processing is successfully completed or not. The data processing unit 25 generates a write response including data of a response identification and a communication ID, and sends the write response along with the result code to the initiator 10.

A read request is equivalent to a "Check Command" defined by the specification, and its data structure Rreq includes fields for a request identifier (ID), a communication ID (IDm), the number of services (NOS), a service code list (SLST), the number of blocks (NOB), a block list (BLST). A read response is equivalent to a "Check Response" defined by the specification, and its data structure Rres includes fields for a response identifier (ID), a communication ID (IDm), a result code (SF), the number of blocks (NOB), and read data (DATA). The read response with this data structure Rres that includes read data is sent from the target 20 to the initiator 10.

Upon receiving a read request, the data processing unit 25 of the target 20 extracts the request identifier, the number of blocks, and the block list of the read request, and supplies them to the control unit 21. Here, the number of blocks and the block list respectively indicate the number of blocks and the block codes of read data to be read out from the target 20. After the read processing is completed, the control unit 21 supplies a result code, the number of blocks, and the read data to the data processing unit 25. Here, the result code indicates whether the read processing is successfully completed or not, and the number of blocks indicates the block number of the read data. The data processing unit 25 generates a read response including a response identification, a communication ID, the number of blocks, the read data, and sends the read response along with the result code to the initiator 10.

Figure 8:
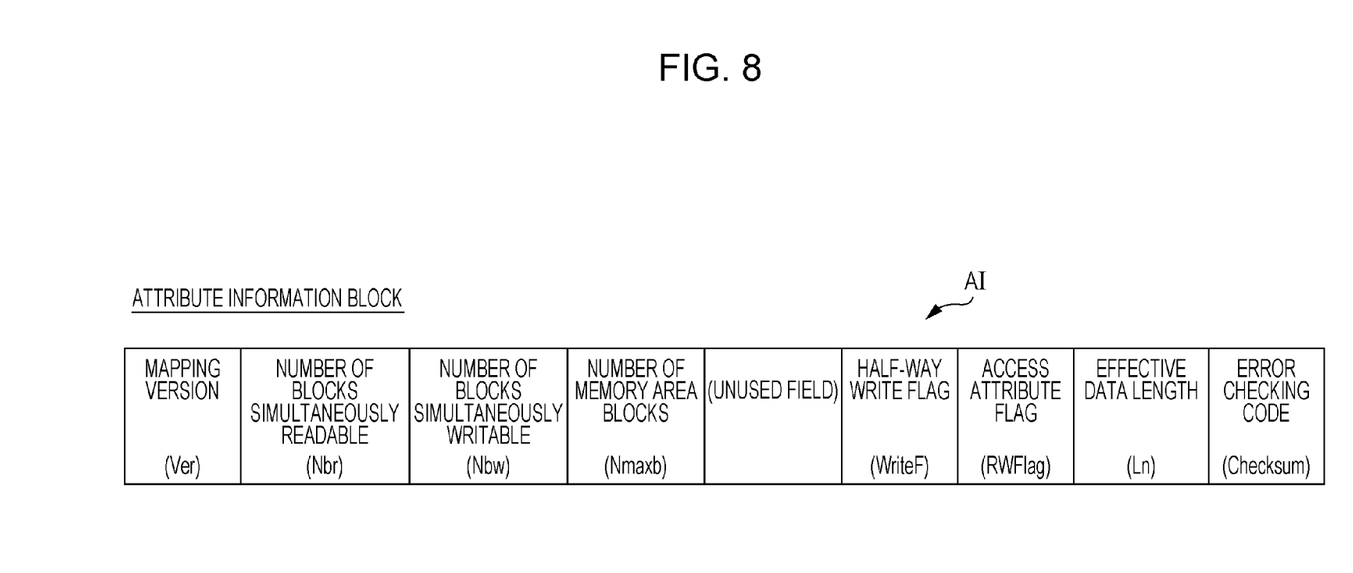
FIG. 8 is a diagram showing an example of a data structure of an attribute information block.

FIG. 8 is a diagram showing an example of a data structure of an attribute information block. As shown in FIG. 8, the data structure AI of the attribute information block includes fields for a mapping version (Ver), the number of blocks simultaneously readable (Nbr), the number of blocks simultaneously writable (Nbw), the number of memory area blocks (Nmaxb), a half-way write flag (WriteF), an access attribute flag (RWFlag), an effective data length (Ln), and an error checking code (Checksum).

Upon receiving a read request, the target 20 updates the effective data length field and the error checking code field of the attribute information block, and supplies them along with a read response to the initiator 10. In this case, when the target 20 generates read data, the effective data length field is updated with the data length of the read data. When the target 20 does not generate read data, the effective data length field is updated with the value of "0". Upon receiving the attribute information block along with the read response, the target 20 reads out plural pieces of data whose number is designated by the value in the effective data length field from the read data field of the read response.

5. CONCLUSION

As described above, according to the communication system and communication method of the present disclosure, the target 20 can send read data to the initiator 10 at an arbitrary timing through responding at the timing of the read data generation in response to a read request that the target repeatedly receives even if it does not have the notification function of communication request. Therefore, a two-way communication can be effectively performed between the initiator 10 and the target 20 in synchronization with the timing of data generation.

Although the detailed descriptions have been made about the preferred embodiments of the present disclosure with reference to the accompanying drawings, the present disclosure is not to be restricted by the above-described embodiments. It will be obvious that those skilled in the art of the present disclosure can easily conceive of various alterations and modifications of the above embodiments of the present disclosure within the scope of the technical ideas described in the following claims, and it is to be understood that such alterations and modifications naturally fall within the technical scope of the present disclosure.

For example, the descriptions of the above embodiments of the present disclosure have been made under the assumption that the control unit 11 of the initiator 10 and the control unit 21 of the target 20 respectively judge whether the generation of the write data and the generation of read data are successfully completed or not. However, whether the generation of the write data and the generation of read data are successfully completed or not can be judged respectively by the data processing unit 15 of the initiator 10 and by the data processing unit 25 of the target 20. In this case, after the data processing units 15 and 25 are respectively notified of the generations of the write data and the read data by the control units 11 and 21, these processing units judge whether the generations of the write data and the read data are successfully completed or not.

What is claimed is:

1. A communication apparatus comprising:
a data generating unit for generating write data to be sent to another communication apparatus at an arbitrary timing;
a communication unit for repeatedly sending a read request to the other communication apparatus until the write data is generated and, at the same time, for repeatedly receiving a read response sent from the other communication apparatus in response to the read request; and
a data acquisition unit for acquiring read data, which is sent along with the read response by the other communication apparatus, when the read data is generated at an arbitrary timing by the other communication apparatus,
in which only after the read data has been fully generated and after receipt of a respective read request after the read data has been fully generated, the other communication apparatus sends the read data for acquisition by the data acquisition unit of the communication apparatus, such that the other communication apparatus sends the fully generated read data to the communication apparatus without having to issue a notification communication to the communication apparatus indicating that the read data has been fully generated prior to sending the fully generated read data thereto, and
in which communication between the communication apparatus and the other communication apparatus, including all of the sending of the read request by the communication unit, all of the sending and receiving of the read response, and all of the sending and receiving of the read data, is by way of a single type of communication technology with a single type of protocol which is passive communication in compliance with a near field communication (NFC) protocol for communication apparatuses spaced within approximately several tens of centimeters of each other.

2. The communication apparatus according to claim 1, in which when the write data is completely generated, the communication unit is configured to send the write data along with a write request for receipt by the other communication apparatus and to not send the read request for receipt by the other communication apparatus.

3. The communication apparatus according to claim 2, in which after the write data and the write request are sent and a response is received indicating that the write data has been properly written to the other communication, the communication apparatus is configured to start sending the read request for receipt by the other communication apparatus.

4. A communication apparatus comprising:
a data generating unit for generating read data to be sent to another communication apparatus at an arbitrary timing; and
a communication unit for repeatedly receiving a read request sent from the other communication apparatus until write data is generated by the other communication apparatus and, at the same time, for repeatedly sending a read response to the other communication apparatus in response to the read request, and for sending the read data along with the read response to the other communication apparatus when the read data is generated,
in which only after the read data has been fully generated and after receipt of a respective read request after the read data has been fully generated, the communication apparatus sends the read data for receipt by the other communication apparatus, such that the communication apparatus is configured to send the fully generated read data to the other communication apparatus without having to issue a notification communication to the other communication apparatus indicating that the read data has been fully generated prior to sending the fully generated read data thereto, and in which communication between the communication apparatus and the other communication apparatus, including all of the sending of the read response by the communication unit, all of the sending and receiving of the read request, and all of the sending and receiving of the read data, is by way of a single type of communication technology with a single type of protocol which is passive communication in compliance with a near field communication (NFC) protocol for communication apparatuses spaced within approximately several tens of centimeters of each other.

5. A communication system comprising:

a first communication apparatus that includes:
  a data generating unit for generating write data to be sent to a second communication apparatus at an arbitrary timing;
  a communication unit for repeatedly sending a read request to the second communication apparatus until the write data is generated and, at the same time, for repeatedly receiving a read response sent from the second communication apparatus in response to the read request; and
  a data acquisition unit for acquiring read data, which is sent along with the read response by the second communication apparatus, when the read data is generated at an arbitrary timing by the second communication apparatus, and the second communication apparatus includes:
  a data generating unit for generating read data to be sent to the first communication apparatus at an arbitrary timing; and
  a communication unit for repeatedly receiving the read request sent from the first communication apparatus until the write data is generated by the first communication apparatus and, at the same time, for repeatedly sending the read response to the first communication apparatus in response to the read request, and for sending the read data along with the read response to the first communication apparatus when the read data is generated,
  in which only after the read data has been fully generated and after receipt of a respective read request after the read data has been fully generated, the communication unit of the second communication apparatus sends the read data for receipt by the first communication apparatus, such that the second communication apparatus is configured to send the fully generated read data to the first communication apparatus without having to issue a notification communication to the first communication apparatus indicating that the read data has been fully generated prior to sending the fully generated read data thereto, and
  in which communication between the first communication apparatus and the second communication apparatus, including all of the sending and receiving of the read request, all of the sending and receiving of the read response, and all of the sending and receiving of the read data, is by way of a single type of communication technology with a single type of protocol which is passive communication in compliance with a near field communication (NFC) protocol for communication apparatuses spaced within approximately several tens of centimeters of each other.

6. A communication method comprising:

causing a first communication apparatus to generate write data to be sent to a second communication apparatus at an arbitrary timing;

causing the second communication apparatus to generate read data to be sent to the first communication apparatus at an arbitrary timing;

causing the first communication apparatus to repeatedly send a read request to the second communication apparatus until the write data is generated;

causing the second communication apparatus to repeatedly send a read response in response to the read request to the first communication apparatus; and causing the first communication apparatus to receive the read response and acquire the read data, which is sent along with the read response by the second communication apparatus, when the read data is generated by the second communication apparatus, in which only after the read data has been fully generated and after receipt of a respective read request after the read data has been fully generated, the second communication apparatus sends the read data for receipt by the first communication apparatus, such that the second communication apparatus sends the fully generated read data to the first communication apparatus without having to issue a notification communication to the first communication apparatus indicating that the read data has been fully generated prior to sending the fully generated read data thereto, and in which communication between the first communication apparatus and the second communication apparatus, including all of the sending and receiving of the read request, all of the sending and receiving of the read response, and all of the sending and receiving of the read data, is by way of a single type of communication technology with a single type of protocol which is passive communication in compliance with a near field communication (NFC) protocol for communication apparatuses spaced within approximately several tens of centimeters of each other.

7. A communication apparatus to communicate with other communication apparatus via short range wireless communication, said communication apparatus comprising:

a data generating unit for generating write data to be sent to another communication apparatus at an arbitrary timing; and a communication unit for repeatedly sending a read request via the short range wireless communication to the other communication apparatus until the write data is generated and, for repeatedly receiving a read response via the short range wireless communication from the other communication apparatus in response to the read request, when the write data has been generated, the communication unit is configured to send the write data instead of the read request via the short range wireless communication to the other communication apparatus, and all of the short range wireless communication between the communication apparatus and the other communication apparatus is a single type of communication technology with a single type of protocol which is passive communication in compliance with a near field communication (NFC) protocol for communication apparatuses spaced within approximately several tens of centimeters of each other.

8. The communication apparatus according to claim 7, further comprising a data acquisition unit for acquiring read data, which is sent along with the read response by the other communication apparatus, when the read data is generated by the other communication apparatus.

9. The communication apparatus according to claim 7, wherein, the communication unit is configured to repeatedly send the read request to the other communication apparatus after establishing communication with the other communication apparatus.

10. A communication apparatus to communicate with other communication apparatus via short range wireless communication, said communication apparatus comprising:
   a data generating unit for generating read data to be sent to another communication apparatus at an arbitrary timing;
   a communication unit for repeatedly receiving a read request sent via the short range wireless communication from the other communication apparatus until write data is generated by the other communication apparatus and, for repeatedly sending a read response via the short range wireless communication to the other communication apparatus in response to the read request; and
   a data acquisition unit for acquiring read data, which is sent via the short range wireless communication along with the read response by the other communication apparatus, when the read data is generated by the other communication apparatus,
   all of the short range wireless communication between the communication apparatus and the other communication apparatus is a single type of communication technology with a single type of protocol which is passive communication in compliance with a near field communication (NFC) protocol for communication apparatuses spaced within approximately several tens of centimeters of each other.

11. A communication apparatus to communicate with other communication apparatus via short range wireless communication, said communication apparatus comprising:
   a data generating unit for generating read data to be sent to another communication apparatus at an arbitrary timing; and
   a communication unit for repeatedly receiving a read request sent via the short range wireless communication from the other communication apparatus until write data is generated by the other communication apparatus and, for repeatedly sending a read response via the short range wireless communication to the other communication apparatus in response to the read request,
   wherein the communication unit is configured to send the read data via the short range wireless communication along with the read response to the other communication apparatus when the read data is generated, and
   all of the short range wireless communication between the communication apparatus and the other communication apparatus is a single type of communication technology with a single type of protocol which is passive communication in compliance with a near field communication (NFC) protocol for communication apparatuses spaced within approximately several tens of centimeters of each other.

12. The communication apparatus according to claim 11, wherein, on receiving a write request sent from the other communication apparatus, the communication apparatus is configured to delete the read data sent to the other communication apparatus along with the last read response.

13. The communication apparatus according to claim 11, wherein, the communication unit is configured to receive the write data from the other communication apparatus after establishing communication with the other communication apparatus, when the write data is generated by the other communication apparatus.

14. The communication apparatus according to claim 11, wherein, the communication unit is configured to repeatedly send a read response to the other communication apparatus in response to the read request, when the read data is not generated.

* * * * *